US012151823B2

(12) United States Patent
Carson et al.

(10) Patent No.: US 12,151,823 B2
(45) Date of Patent: Nov. 26, 2024

(54) HIGH COMFORT ENDURANCE HAPTIC CUSHION

(71) Applicant: Rockwell Collins, Inc., Cedar Rapids, IA (US)

(72) Inventors: Kassidy L. Carson, Colorado Springs, CO (US); John L Hampton, Bradenton, FL (US); Glen Shaw, Colorado Springs, CO (US); Daniel R. Tribble, Colorado Springs, CO (US); Larry Parker, Colorado Springs, CO (US); Donald Borchelt, Monument, CO (US); John R. Skola, Rowlett, TX (US); James Donald Womack, Peyton, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 48 days.

(21) Appl. No.: 17/900,760

(22) Filed: Aug. 31, 2022

(65) Prior Publication Data

US 2024/0067345 A1 Feb. 29, 2024

(51) Int. Cl.
*B64D 25/10* (2006.01)
*B64D 45/00* (2006.01)

(52) U.S. Cl.
CPC ............ *B64D 25/10* (2013.01); *B64D 45/00* (2013.01)

(58) Field of Classification Search
CPC ......... B64D 25/10; B64D 45/00; G05B 15/02
USPC ........................................................ 700/275
See application file for complete search history.

(56) References Cited

U.S. PATENT DOCUMENTS

| 6,014,784 A | 6/2000 | Taylor et al. |
| 6,744,370 B1* | 6/2004 | Sleichter, III .......... G08B 21/06 340/576 |
| 8,339,285 B2 | 12/2012 | Boren et al. |
| 8,730,065 B2 | 5/2014 | Herman et al. |
| 9,248,904 B2* | 2/2016 | Nouvel .............. B64D 11/0689 |
| 9,504,416 B2* | 11/2016 | Young ...................... A61B 5/18 |

(Continued)

FOREIGN PATENT DOCUMENTS

| CN | 206621529 | 11/2017 |
| DE | 202019100400 | 1/2020 |

(Continued)

OTHER PUBLICATIONS

United Kingdom Intellectual Property Office, United Kingdom Search Report dated Jan. 19, 2024 in Application No. GB2312682.4.

*Primary Examiner* — Ronald D Hartman, Jr.
(74) *Attorney, Agent, or Firm* — SNELL & WILMER L.L.P.

(57) ABSTRACT

A system is disclosed herein, including a cushion including a plurality of tactors and a plurality of air bladders disposed adjacent the plurality of tactors, a pump assembly operably connected to the plurality of bladders, a processor, and a memory operatively coupled to the processor. The memory includes instructions stored thereon that, when executed by the processor, cause the processor to determine an inflation sequence for the plurality of air bladders, determine a deflation sequence for the plurality of air bladders, output commands to the pump assembly corresponding to the inflation sequence and the deflation sequence, and output vibrate commands to the plurality of tactors.

4 Claims, 8 Drawing Sheets

(56) References Cited

U.S. PATENT DOCUMENTS

| | | | |
|---|---|---|---|
| 9,545,879 B2* | 1/2017 | Stebbins | B60Q 9/008 |
| 10,940,872 B2* | 3/2021 | Alexiou | G05B 9/00 |
| 2013/0154319 A1* | 6/2013 | Nouvel | B64D 11/0689 |
| | | | 297/217.3 |
| 2015/0008710 A1* | 1/2015 | Young | B60N 2/914 |
| | | | 297/217.3 |
| 2016/0012992 A1 | 1/2016 | Chauvet et al. | |
| 2016/0031738 A1 | 2/2016 | Luo et al. | |
| 2016/0129920 A1* | 5/2016 | Hall | B60N 2/665 |
| | | | 701/1 |
| 2019/0344043 A1* | 11/2019 | Migneco | A61M 21/00 |
| 2020/0010197 A1 | 1/2020 | Otovic | |
| 2020/0072635 A1* | 3/2020 | Hornstein | B60N 2/976 |
| 2020/0377015 A1* | 12/2020 | Yamamoto | B60Q 9/00 |
| 2020/0398700 A1* | 12/2020 | Migneco | B60N 2/002 |
| 2022/0332235 A1* | 10/2022 | Bennis | B60N 2/914 |

FOREIGN PATENT DOCUMENTS

| | | | |
|---|---|---|---|
| EP | 1688118 | 8/2006 | |
| JP | 2018070075 | 5/2018 | |
| WO | WO-2014188187 A1 * | 11/2014 | A47C 31/126 |

* cited by examiner

HIGH COMFORT ENDURANCE HAPTIC CUSHION

FIELD

The present disclosure generally relates aircraft seats, and more particularly, to endurance haptic systems for aircraft seats and methods for operating endurance haptic systems for aircraft seats.

BACKGROUND

Aircraft typically include means for visually and auditorily communicating information and/or warnings to the aircrew. For example, the information may be conveyed to the aircrew via display monitors, indicator lights, head-up displays, helmet mounted displays, speakers, etc. During operations human comfort and fatigue can be a limiting factor in human piloted missions. Additionally, during operations, aircrew can become overwhelmed with visual and auditory information and may find it difficult to focus. Additionally, for visual communication the aircrew needs to be looking at the display to receive the information. In this regard, aircrew may not immediately see the information if he/she is looking externally or at other cockpit systems.

SUMMARY

A system is disclosed herein, including a cushion including a plurality of tactors and a plurality of air bladders disposed adjacent the plurality of tactors, a pump assembly operably connected to the plurality of bladders, a processor, and a memory operatively coupled to the processor. The memory includes instructions stored thereon that, when executed by the processor, cause the processor to determine an inflation sequence for the plurality of air bladders, determine a deflation sequence for the plurality of air bladders, output commands to the pump assembly corresponding to the inflation sequence and the deflation sequence, and output vibrate commands to the plurality of tactors.

In various embodiments, the instructions, when executed by the processor, further cause the processor to determine a vibration sequence for the plurality of tactors and output the vibrate commands to the plurality of tactors based on the vibration sequence. In various embodiments, the vibration sequence includes a duty cycle and a vibration frequency for each of the plurality of tactors, the vibration frequency being an anti-fatigue vibration frequency.

In various embodiments, the system further includes an aircraft controller, wherein the instructions, when executed by the processor, further cause the processor to receive a signal from the aircraft controller, determine a vibration sequence for the plurality of tactors based on the signal received from the aircraft controller, and output vibrate commands corresponding to the vibration sequence to at least a subset of the plurality of tactors. In various embodiments, the vibration sequence includes a vibration frequency for the subset of the plurality of tactors, the vibration frequency being an alert vibration frequency.

In various embodiments, the instructions, when executed by the processor, further cause the processor to receive a signal indicating an emergency and output commands to the pump assembly to deflate the plurality of air bladders in response to the receiving the signal. In various embodiments, the plurality of tactors is disposed between the plurality of air bladders and a top surface of the cushion.

Also disclosed herein is a method including determining, by a processor, an inflation sequence for a plurality of air bladders, determining, by the processor, a deflation sequence for the plurality of air bladders, determining, by the processor, a vibration sequence for a plurality of tactors disposed adjacent the plurality of air bladders, outputting, by the processor, commands to a pump assembly corresponding to the inflation sequence and the deflation sequence, and outputting, by the processor, vibrate commands to the plurality of tactors corresponding to the vibration sequence.

In various embodiments, the vibration sequence includes a duty cycle and a vibration frequency for each of the plurality of tactors, the vibration frequency being an anti-fatigue vibration frequency. In various embodiments, the method further includes receiving, by the processor, a signal from an aircraft controller, determining, by the processor, a second vibration sequence based on the signal received from the aircraft controller, and outputting, by the processor, alert vibrate commands corresponding to the second vibration sequence to a subset of the plurality of tactors.

In various embodiments, the method further includes outputting, by the processor, stop vibrate commands to the plurality of tactors before outputting the alert vibrate commands to the subset of the plurality of tactors. In various embodiments, the method further includes receiving, by the processor, a signal indicating an emergency and outputting, by the processor, emergency deflate commands to the pump assembly to deflate the plurality of air bladders.

In various embodiments, the method further includes outputting, by the processor, the commands to the pump assembly for a first period of time and outputting, by the processor, the vibrate commands to the plurality of tactors for a second period of time that does not overlap the first period of time. In various embodiments, the vibration sequence includes a duty cycle and a vibration frequency for each of the plurality of tactors. In various embodiments, the inflation sequence and the deflation sequence include a duty cycle for inflating and deflating each of the plurality of air bladders.

Also disclosed herein is an ejection seat. The ejection seat includes a seatback including a seatback cushion, a seat bucket coupled to the seatback, the seat bucket including a seat cushion, a plurality of seatback tactors located in the seatback cushion, a plurality of seatback air bladders located in the seatback cushion, a plurality of seat tactors located in the seat cushion, a plurality of seat air bladders located in the seat cushion, and a controller operably coupled to the plurality of seatback tactors, the plurality of seatback air bladders, the plurality of seat tactors, and the plurality of seat air bladders, the controller being configured to send vibration commands to the plurality of seatback tactors and the plurality of seat tactors, and the controller being configured to send inflation commands to the plurality of the seatback air bladders and the plurality of seat air bladders.

In various embodiments, the controller is further configured to control a frequency of vibration of the plurality of seatback tactors and the plurality of seat tactors. In various embodiments, the frequency of vibration is either an alert frequency or an anti-fatigue frequency. In various embodiments, the controller is further configured to receive a signal from an aircraft controller and determine a vibration sequence based on the signal received from the aircraft controller. In various embodiments, the signal is an emergency signal, and the controller is further configured send deflate commands to the plurality of seatback air bladders and the plurality of seat air bladders in response to the emergency signal.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
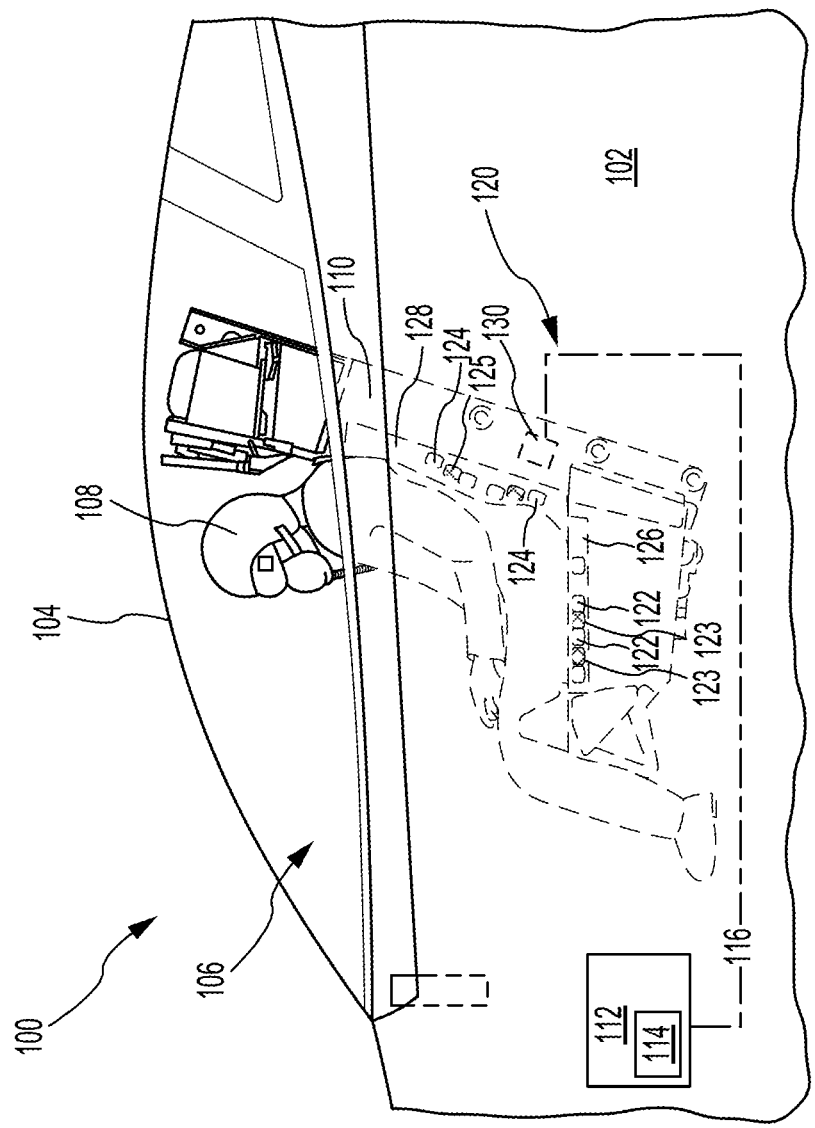
FIG. 1 illustrates an occupant seated on an ejection seat in a cockpit of an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is an endurance haptic system for use with aircraft seats, including ejection seats. In various embodiments, the endurance haptic system includes a seat cushion and a seatback cushion. The seat cushion includes a plurality of seat air bladders and a plurality of seat tactors. The seatback cushion includes a plurality of seatback air bladders and a plurality of seatback tactors. In various embodiments, the endurance haptic system includes a pump assembly that is operably connected to the plurality of seat air bladders and the plurality of seatback air bladders. In various embodiments, the endurance haptic system includes a controller that is operably connected to the pump assembly, the plurality of seat tactors, and the plurality of seatback tactors. In various embodiments, the controller and/or the pump assembly may be integral with either the seat cushion or the seatback cushion.

In various embodiments, the controller may operate in a tactical mode and in a non-tactical mode. The tactical mode and non-tactical mode may be alternatively referred to as a high sensitivity and low sensitivity mode, respectively. In the non-tactical mode, the controller may control the endurance haptic system to prevent pilot fatigue, muscle cramping, and blood clots, or to otherwise facilitate overall comfort. In various embodiments, the controller may inflate and deflate the plurality of seat air bladders and/or plurality of seatback air bladders according to an inflation sequence and a deflation sequence to encourage blood flow in the pilot and reduce fatigue. In various embodiments, the controller may send vibrate commands to the plurality of seat tactors and/or plurality of seatback tactors to encourage blood flow in the pilot and reduce fatigue. In various embodiments, the plurality of seat tactors and/or plurality of seatback tactors may vibrate at a low, anti-fatigue frequency. In various embodiments, the plurality of seat tactors and/or the plurality of seatback tactors may vibrate at high, alert frequency.

In the tactical mode, the controller may control the endurance haptic system to provide feedback to the pilot. In various embodiments, the controller may be in communication with an aircraft controller and receive mission signals from the aircraft controller. The controller may send vibrate commands to the plurality of seat tactors and/or the plurality of seatback tactors in response to receiving the mission signals from the aircraft controller. In various embodiments, the plurality of seat tactors and/or plurality of seatback tactors may vibrate at a high, alert frequency. In various embodiments, the haptic feedback may be indicative of an aircraft location, a geographical boundary, and/or a mission boundary, among others. While the discussion herein relates to ejection seats, it is understood that this disclosure may be generally applied to any domain employing seated-human piloted/occupied missions or endeavors, including, but not limited to, land, sea, air, and space applications using both endurance/comfort and alerting functions.

Referring now to FIG. 1, an aircraft 100 is illustrated. In various embodiments, the aircraft 100 includes a fuselage 102 and a canopy 104 enclosing an internal cockpit 106 in which an occupant 108 (e.g., a pilot) is positioned while operating the aircraft 100. An ejection seat 110 is disposed within the cockpit 106. Ejection seat 110 is configured to accommodate the occupant 108 during operation of the aircraft 100 as well as during an ejection sequence, which may be initiated in response to an emergency, a malfunction of aircraft 100, or any other ejection event.

In accordance with various embodiments, an aircraft controller 112 is installed in aircraft 100. Aircraft controller 112 may comprise a network, computer-based system, and/or or software components configured to provide an access point to various systems, engines, and components of aircraft 100. In various embodiments, aircraft controller 112 may be implemented as and may include one or more processors and/or one or more tangible, non-transitory memories capable of implementing logic in response to execution by the aircraft controller 112. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Aircraft controller 112 may comprise a processor configured to implement various logical operations in response to execution of instructions, for example, instructions stored on a non-transitory, tangible, computer-readable memory 114 configured to communicate with aircraft controller 112. Memory 114 may store instructions usable by the logic device(s) to perform operations and make determinations related to the control of (e.g., the signals 116 sent to) a endurance haptic system 120.

In accordance with various embodiments, endurance haptic system 120 may be installed on ejection seat 110. Endurance haptic system 120 includes seat tactors 122 located in a seat cushion 126 and/or seatback tactors 124 located in a seatback cushion 128 of ejection seat 110. Endurance haptic system 120 further includes seat air bladders 123 located in seat cushion 126 and/or seatback air bladders 125 located in seatback cushion 128. In accordance with various embodiments, the seat tactors 122 and seatback tactors 124 (collectively referred to as tactors 122, 124) may be energized by a controller 130 of endurance haptic system 120. In accordance with various embodiments, seat air bladders 123 and seatback air bladders 125 (collectively referred to as air bladders 123, 125) may be controlled by controller 130. The controller 130 is in communication, via wired or wireless connection, with aircraft controller 112. In accordance with various embodiments, controller 130 is configured to energize (e.g., send vibrate commands to) tactors 122, 124 in response to signals 116 received from aircraft controller 112. In accordance with various embodiments, controller 130 is further configured to control inflation and deflation of air bladders 123, 125 to reduce pilot fatigue, muscle cramping, and risk of blood clots, among others.

In accordance with various embodiments, the tactors 122, 124 may be energized individually, in groups, and/or collectively at varying frequencies, in varying order(s)/sequence(s), and/or at varying intervals (e.g., durations of time). In this regard, controller 130 is configured to determine which tactors 122, 124 to energize based on the signal(s) 116 received from aircraft controller 112. Vibration of tactors 122, 124 may be configured to alert occupant 108 of an impending danger or other situation of which the occupant 108 should be made aware. The location, strength, sequence, and/or duration of the vibrations can be configured to convey information to occupant 108 and/or to direct the attention of the occupant 108 in a particular direction. In various embodiments, controller 130 is configured to energize tactors 122, 124 to reduce pilot fatigue, muscle cramping, and risk of blood clots, among others, when in a non-tactical situation by varying location, strength, sequence, and/or duration of the vibrations of tactors 122, 124. In various embodiments, the strength of vibrations (e.g., the frequency of vibration) in a non-tactical situation may be weaker than the strength of vibration when in a tactical situation. In various embodiments, the duration of vibration in a non-tactical situation may be longer than the duration of vibration when in a tactical situation.

While endurance haptic system 120 is described with reference to an ejection seat 110, it is contemplated and understood that endurance haptic system 120 may be used with other types of crewmember seats, including for commercial aircraft. For example, endurance haptic system 120 may be installed on crewmember seats which do not eject from an aircraft (e.g., on pilot or copilot seats in commercial and/or private aircraft and/or on rotary or fixed wing aircraft). In various embodiments, tactors, similar to tactors 122, 124, and/or air bladders, similar to air bladders 123, 125, may be installed in a flight suit worn by occupant 108. In various embodiments, one or more of tactors 122 or tactors 124 may be located at the midplane 148 or midplane 158, respectively (as illustrated in FIG. 2).

Figure 2:
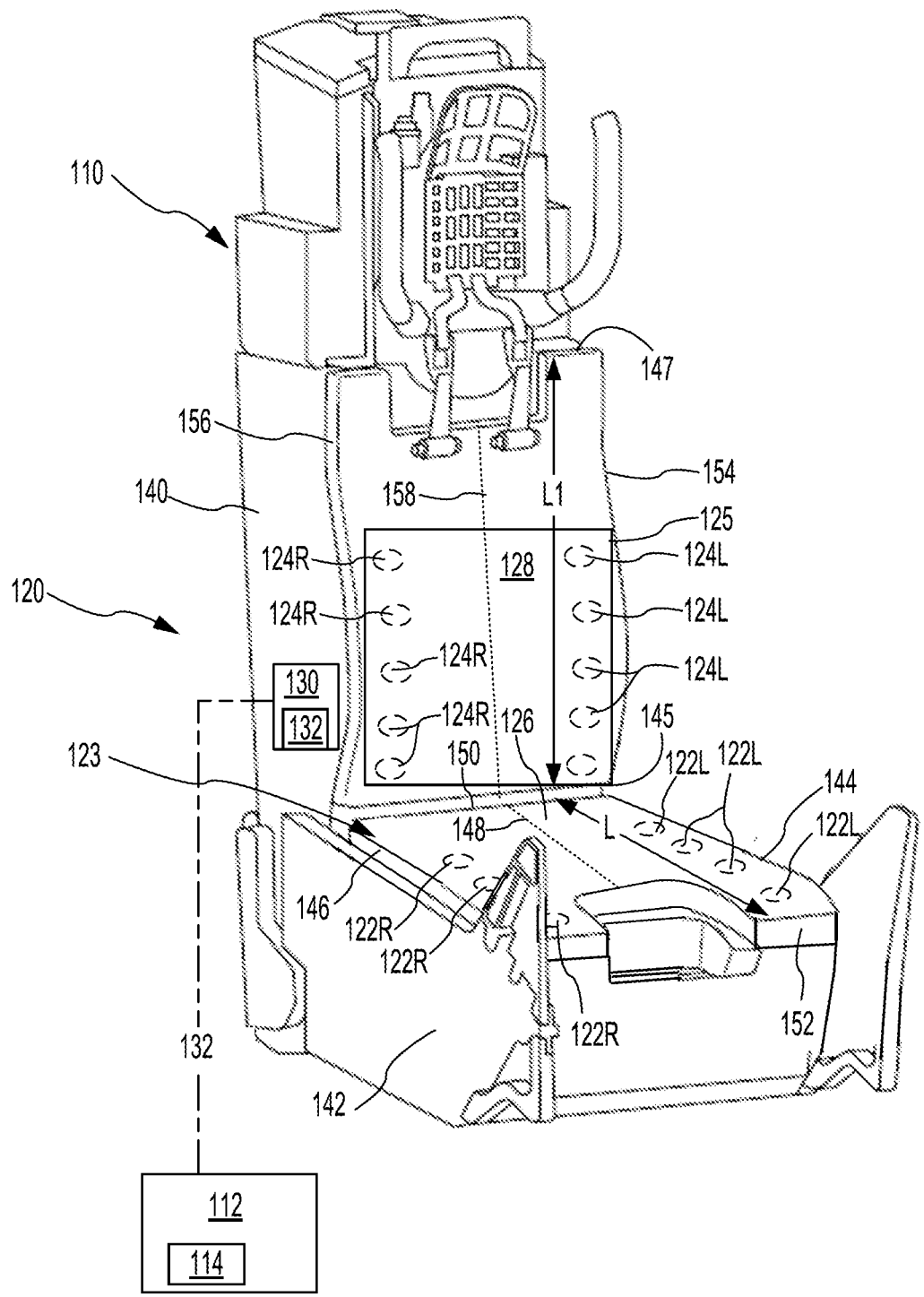
FIG. 2 illustrates an ejection seat including an endurance haptic system, in accordance with various embodiments.

With reference to FIG. 2, additional details of ejection seat 110 and endurance haptic system 120 are illustrated. In accordance with various embodiments, ejection seat 110 includes a seatback 140 and a seat bucket 142. Seat cushion 126 may be located over and/or on seat bucket 142. Seatback cushion 128 may be located over and/or on seatback 140. Seat tactors 122 may include a plurality of first (or left) seat tactors 122L located proximate a left side 144 of seat cushion 126, and a plurality of second (or right) seat tactors 122R located proximate a right side 146 of seat cushion 126. Left seat tactors 122L may be located between a midplane 148 of seat cushion 126 and left side 144 of seat cushion 126. Midplane 148 is an imaginary plane/line located halfway between left side 144 of seat cushion 126 and right side 146 of seat cushion 126 and extending from a backside 150 of seat cushion 126 to a frontside 152 of seat cushion 126. The backside 150 of seat cushion 126 is located proximate seatback 140. The frontside 152 of seat cushion 126 is opposite the backside 150 of the seat cushion 126 and seatback 140. Stated differently, the frontside 152 of the seat cushion 126 is distal to seatback 140. In various embodiments, left seat tactors 122L may be located halfway between the midplane 148 of seat cushion 126 and the left side 144 of seat cushion 126. In various embodiments, left seat tactors 122L may be located closer to the left side 144 of seat cushion 126 than to the midplane 148 of seat cushion 126. In various embodiments, right seat tactors 122R may be located halfway between the midplane 148 of seat cushion 126 and the right side 146 of seat cushion 126. In various embodiments, right seat tactors 122R may be located closer to the right side 146 of seat cushion 126 than to the midplane 148 of seat cushion 126.

In various embodiments, seat air bladders 123 may be located between seat tactors 122. In various embodiments, seat air bladders 123 may be located beneath seat tactors 122 such that seat tactors 122 are between a top portion of seat cushion 126 and seat air bladders 123. In various embodiments, seat air bladders 123 may include recesses in which seat tactors 122 are located. In various embodiments, seat air bladders 123 may zig-zig around tactors 122, such that seat air bladders 123 extend in alternating directions with each seat air bladder 123 changing direction to accommodate seat tactors 122.

Left seat tactors 122L may be arranged in a series (e.g., in a row) along left side 144 of seat cushion 126. Right seat tactors 122R may be arranged in a series (e.g., in a row) along right side 146 of seat cushion 126. In various embodiments, the left seat tactor 122L and the right seat tactor 122R closest to seatback 140 may be located at least 15%, at least 25%, and/or at least 33% of a length L of seat cushion 126 away from backside 150. Length L of seat cushion 126 may be measured between backside 150 of seat cushion 126 and the point on frontside 152 of seat cushion 126 that is farthest from backside 150. Stated differently, the left seat tactors 122L and the right seat tactors 122R may be located along 85%, 75%, and/or 67% of the length L of seat cushion 126, such that the area proximate backside 150 and seatback 140 is devoid of left seat tactors 122L and right seat tactors 122R.

Locating left seat tactors 122L and right seat tactors 122R proximate the left side 144 and the right side 146, respectively, of seat cushion 126 and away from backside 150 tends to increase occupant safety during ejection, as left seat tactors 122L and right seat tactors 122R are outboard of the spine, gluteal tuberosity, and pelvis bones, thereby reducing a likelihood that left seat tactors 122L and/or right seat tactors 122R will increase spinal loading during ejection. In this regard, the area proximate midplane 148, and in particular the area proximate midplane 148 and backside 150 of seat cushion 126 may be devoid of seat tactors 122.

Seatback tactors 124 may include a plurality of first (or left) seatback tactors 124L located proximate a left side 154 of seatback cushion 128, and a plurality of second (or right) seatback tactors 124R located proximate a right side 156 of seatback cushion 128. Left seatback tactors 124L may be located between a midplane 158 of seatback cushion 128 and left side 154 of seatback cushion 128. Midplane 158 is an imaginary plane/line located halfway between left side 154 of seatback cushion 128 and right side 156 of seatback cushion 128 and extending from a lower end 145 of seatback cushion 128 to an upper end 147 of seatback cushion 128. The lower end 145 of seatback cushion 128 is located proximate seat bucket 142. The upper end 147 of seatback cushion 128 is opposite the lower end 145 of the seatback cushion 128 and seat bucket 142. Stated differently, the upper end 147 of the seatback cushion 128 is distal to seat bucket 142. In various embodiments, left seatback tactors 124L may be located halfway between the midplane 158 of seatback cushion 128 and the left side 154 of seatback cushion 128. In various embodiments, left seatback tactors 124L may be located closer to the left side 154 of seatback cushion 128 than to the midplane 158 of seatback cushion 128. In various embodiments, right seatback tactors 124R may be located halfway between the midplane 158 of seatback cushion 128 and the right side 156 of seatback cushion 128. In various embodiments, right seatback tactors 124R may be located closer to the right side 156 of seatback cushion 128 than to the midplane 158 of seatback cushion 128.

In various embodiments, seatback air bladders 125 may be located between seatback tactors 124. In various embodiments, seatback air bladders 125 may be located beneath seatback tactors 124 such that seatback tactors 124 are between a top portion of seatback cushion 128 and seatback air bladders 125. In various embodiments, seatback air bladders 125 may include recesses in which seatback tactors 124 are located. In various embodiments, seatback air bladders 125 may zig-zig around seatback tactors 124, such that seatback air bladders 125 extend in alternating directions with each seatback air bladder 125 changing direction to accommodate seatback tactors 124.

Left seatback tactors 124L may be arranged in a series (e.g., in a row) along left side 154 of seatback cushion 128. Right seatback tactors 124R may be arranged in a series (e.g., in a row) along right side 156 of seatback cushion 128. In various embodiments, the left seat tactor 124L and the right seat tactor 124R that are closest to upper end 147 may be located at least 15%, at least 25%, at least 33%, or at least 50% of a length L1 of seatback cushion 128 away from upper end 147. Length L1 may be measured between lower end 145 and upper end 147. Stated differently, the left seatback tactors 124L and the right seatback tactors 124R may be located along 85%, 75%, 67%, or 50% of the length L1 of seatback cushion 128, such that the area proximate upper end 147 of seatback cushion 128 (e.g., the upper 15%, upper 25%, upper third and/or upper half of seatback cushion 128) is devoid of left seatback tactors 124L and right seatback tactors 124R.

Locating left seatback tactors 124L and right seatback tactors 124R only in the lower 85%, the lower 75%, the lower two thirds, or the lower half of seatback cushion 128 tends to increase the probability that the seat occupant's back will be in contact with, or in close proximity to, the portion of the seatback cushion 128 that includes the seatback tactors 124. For example, should the seat occupant be leaning forward and/or have his/her shoulders spaced apart from seatback cushion 128, the lower portion of the occupant's back will likely still be in contact with seatback cushion 128, or will, at least, be located close enough to seatback cushion 128 to feel the vibrations of the seatback tactors 124.

Figure 3A:
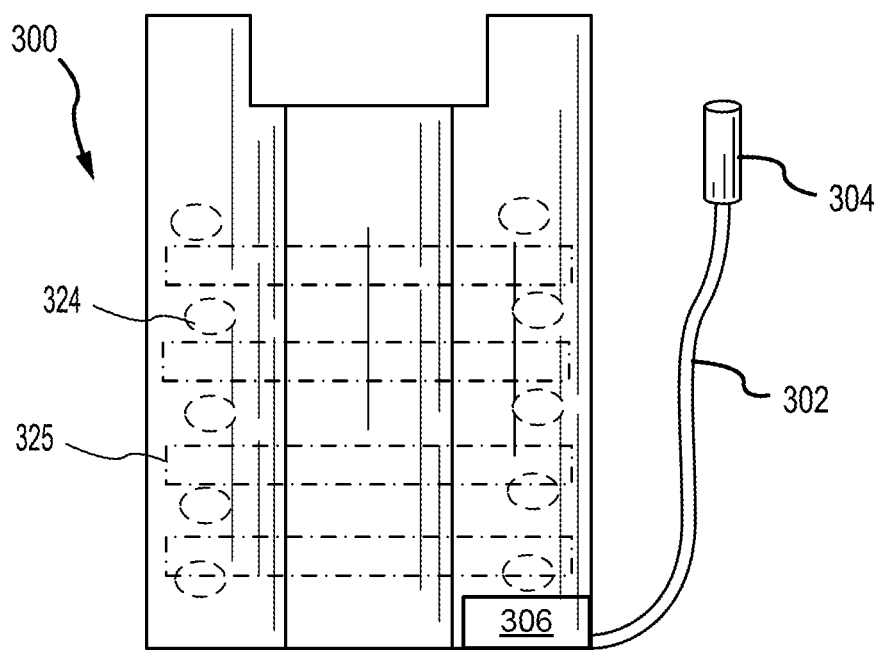
FIGS. 3A and 3B illustrate a seat cushion and a seatback cushion including an endurance haptic system, in accordance with various embodiments.
Figure 3B:
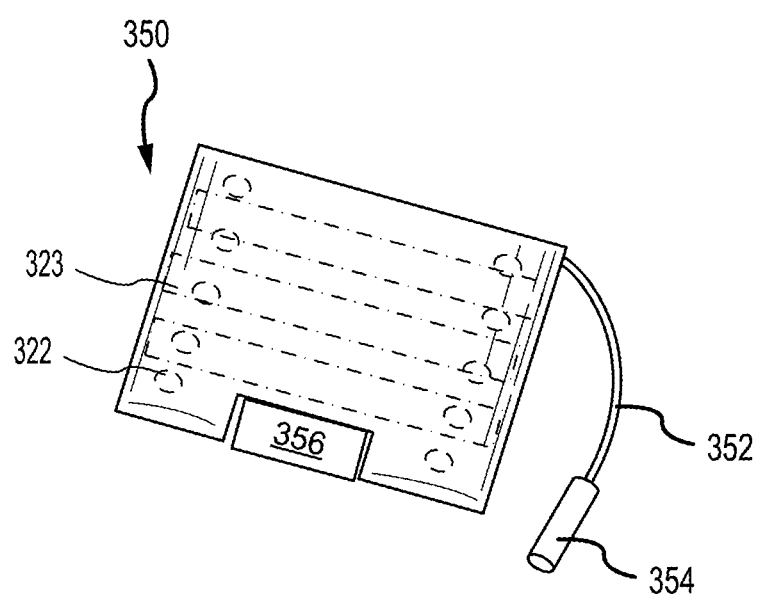

Referring now to FIGS. 3A and 3B, in accordance with various embodiments, perspective views of a seatback cushion 300 and a seat cushion 350 are illustrated. Seatback cushion 300 may be an example of seatback cushion 128 described above with respect to FIGS. 1 and 2. Seat cushion 350 may be an example of seat cushion 126 described above with respect to FIGS. 1 and 2.

Seatback cushion 300 includes a cable 302, a connector 304, a seatback controller 306, a plurality of seatback tactors 324, and a plurality of seatback air bladders 325. Controller 306 may be an example of controller 130 described above with respect to FIGS. 1 and 2. In various embodiments, connector 304 and cable 302 may connect to an aircraft (e.g., aircraft 100) to provide power to controller 306 and/or a signal path between controller 306 and an aircraft controller (e.g., aircraft controller 112). In various embodiments, controller 306 may further include a pump assembly for inflating and deflating seatback air bladders 325. In various embodiments, the pump assembly may be a discrete component. In various embodiments, controller 306 may not be integral with seatback cushion 300. In various embodiments, controller 306 may be located differently in seatback cushion 300.

Seat cushion 350 includes a cable 352, a connector 354, a seat controller 356, a plurality of seat tactors 322, and a plurality of seat air bladders 323. Controller 356 may be an example of controller 130 described above with respect to FIGS. 1 and 2. In various embodiments, connector 354 and cable 352 may connect to an aircraft (e.g., aircraft 100) to provide power to controller 356 and/or a signal path between controller 356 and an aircraft controller (e.g., aircraft controller 112). In various embodiments, controller 356 may further include a pump assembly for inflating and deflating seat air bladders 323. In various embodiments, the pump assembly may be a discrete component. In various embodiments, controller 356 may not be integral with seat cushion 350. In various embodiments, controller 356 may be located differently in seat cushion 350.

Figure 4A:
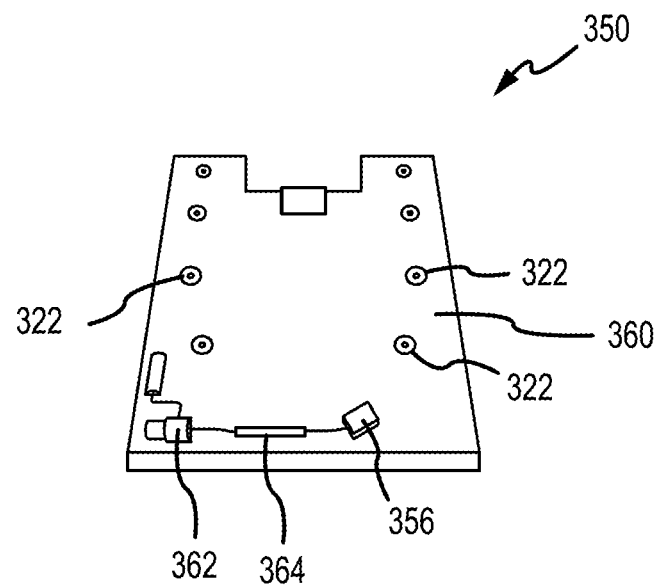
FIGS. 4A, 4B, and 4C illustrate a seat cushion including an endurance haptic system, in accordance with various embodiments.
Figure 4B:
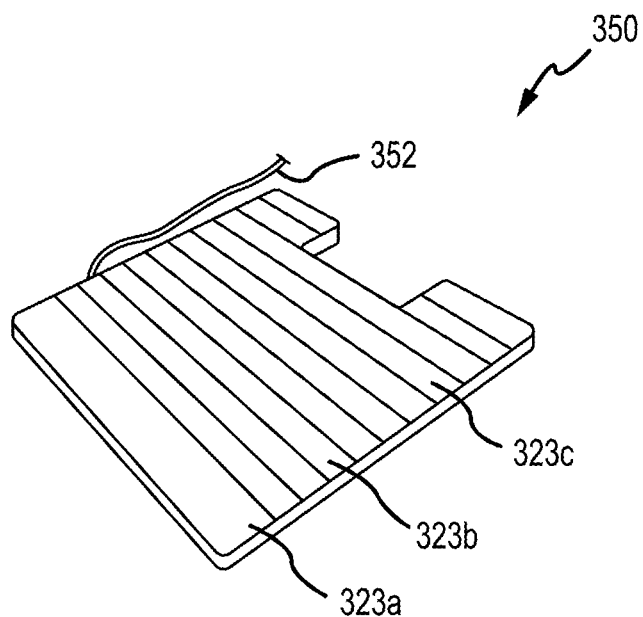
Figure 4C:
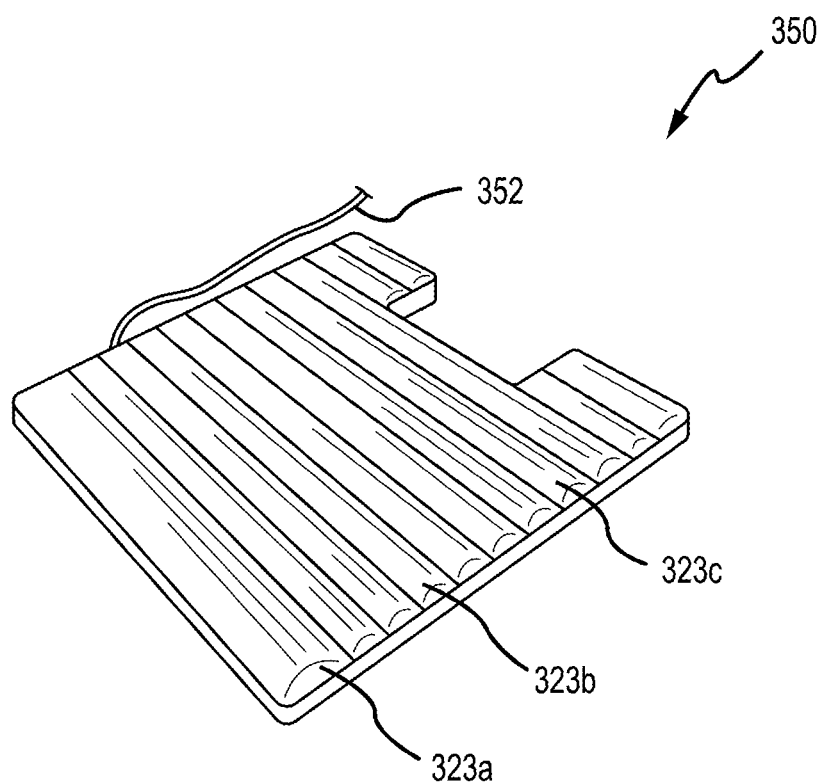

Referring now to FIGS. 4A-4C, in accordance with various embodiments, perspective views of seat cushion 350 are illustrated, which may be representative of seatback cushion 300. FIG. 4A illustrates an underside of the top portion 360 of seat cushion 350. A plurality of tactors 322 is located along the underside of top portion 360 of seat cushion 350, as described above with respect to FIGS. 1 and 2. A pump assembly 362 is illustrated, in accordance with various embodiments. In various embodiments, pump assembly 362 may include an integral manifold with one or more electro-mechanical solenoid devices (e.g., solenoid) to control airflow into and out of seat air bladders 323. In various embodiments, pump assembly 362 may include a separate, external manifold for controlling the airflow into and out of seat air bladders 323. In various embodiments, the one or more electro-mechanical solenoid devices (e.g., solenoid) may be located in the pump assembly 362 or in the external manifold. Pump assembly 362 may be coupled to controller 356 by wires 364. Controller 356 may send instructions to pump assembly 362 via wires 364. In various embodiments, pump assembly 362 and controller 356 may be located differently in seat cushion 350. In various embodiments, control pump assembly 362 includes a mechanical pump for inflating and deflating the plurality of air bladders 323 and an associated electrical control device to cause the mechanical pump to start, stop, and or vent. In various embodiments, the electrical control device may be a power on and off switch that is controlled by controller 356.

FIG. 4B illustrates seat air bladders 323 in a deflated state, including seat air bladders 323a, 323b, 323c. In various embodiments, each seat air bladder 323 (e.g., seat air bladders 323a, 323b, 323c) may be inflated and deflated individually. In various embodiments, all seat air bladder 323 (e.g., seat air bladders 323a, 323b, 323c) may be inflated and deflated collectively. Seat air bladders 323 may be placed over seat tactors 322 (as oriented in FIG. 4B), which may be under seat tactors 322 when seat cushion 350 is installed. In various embodiments, seat air bladders 323 may be arranged laterally (e.g., side to side) across seat cushion 350, as illustrated in FIG. 4B. In various embodiments, seat air bladders 323 may be arranged longitudinally (e.g., front to back) across seat cushion 350. In various embodiments, seat air bladders 323 may be arranged in other configurations, including randomly, within seat cushion 350.

FIG. 4C illustrates seat air bladders 323 in an inflated state. As illustrated, every seat air bladder 323 (e.g., seat air bladder 323a, 323b, 323c) is inflated. However, in various embodiments, seat air bladders 323 may be inflated individually.

Figure 5:
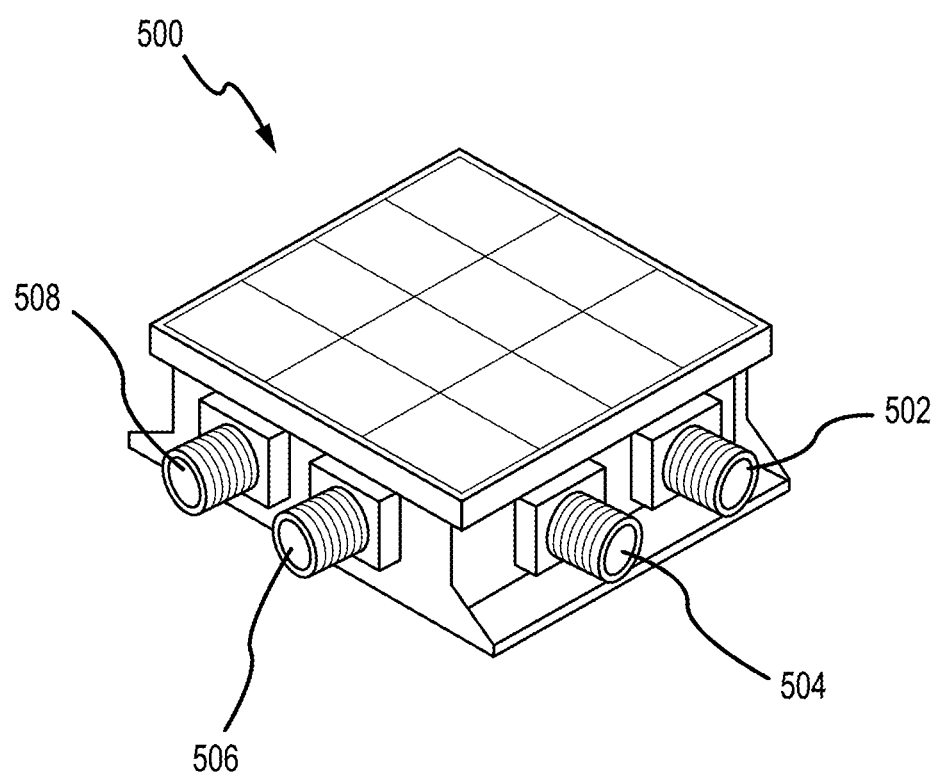
FIG. 5 illustrates an electronic control module for use with an endurance haptic system, in accordance with various embodiments.

Referring now to FIG. 5, in accordance with various embodiments, a control module housing 500 is illustrated. Control module housing 500 may house a controller (e.g., controller 306, controller 356) for controlling seat cushion 350 and/or seatback cushion 300. In various embodiments, control module housing 500 may be integral with seat cushion 350 and/or seatback cushion 300. In various embodiments, control module housing 500 may further include a pump assembly (e.g., pump assembly 362). In various embodiments, control module housing 500 may further include another controller for controlling the pump assembly. Control module housing 500 includes a seatback cushion power/signal connector 502, a seat cushion power/signal connector 504, an aircraft power connector 506, and an aircraft signal connector 508. Seatback cushion power/signal connector 502 may interface with connector 304. Seat cushion power/signal connector 504 may interface with connector 354. Aircraft power connector 506 may interface with a power source in aircraft 100. Aircraft signal connector 508 may interface with aircraft controller 112. In various embodiments, control module housing 500 may be designed for quick release in the event of an emergency, such as an ejection event. In various embodiments, control module housing 500 connectors may be electrical connectors, pneumatic connectors, and/or a combination of electrical and pneumatic connectors. In various embodiments, the electrical and/or pneumatic connections may be severed by a cutting blade (e.g., a guillotine) that renders the devices inoperable or otherwise neutral and safe for ejection.

Figure 6:
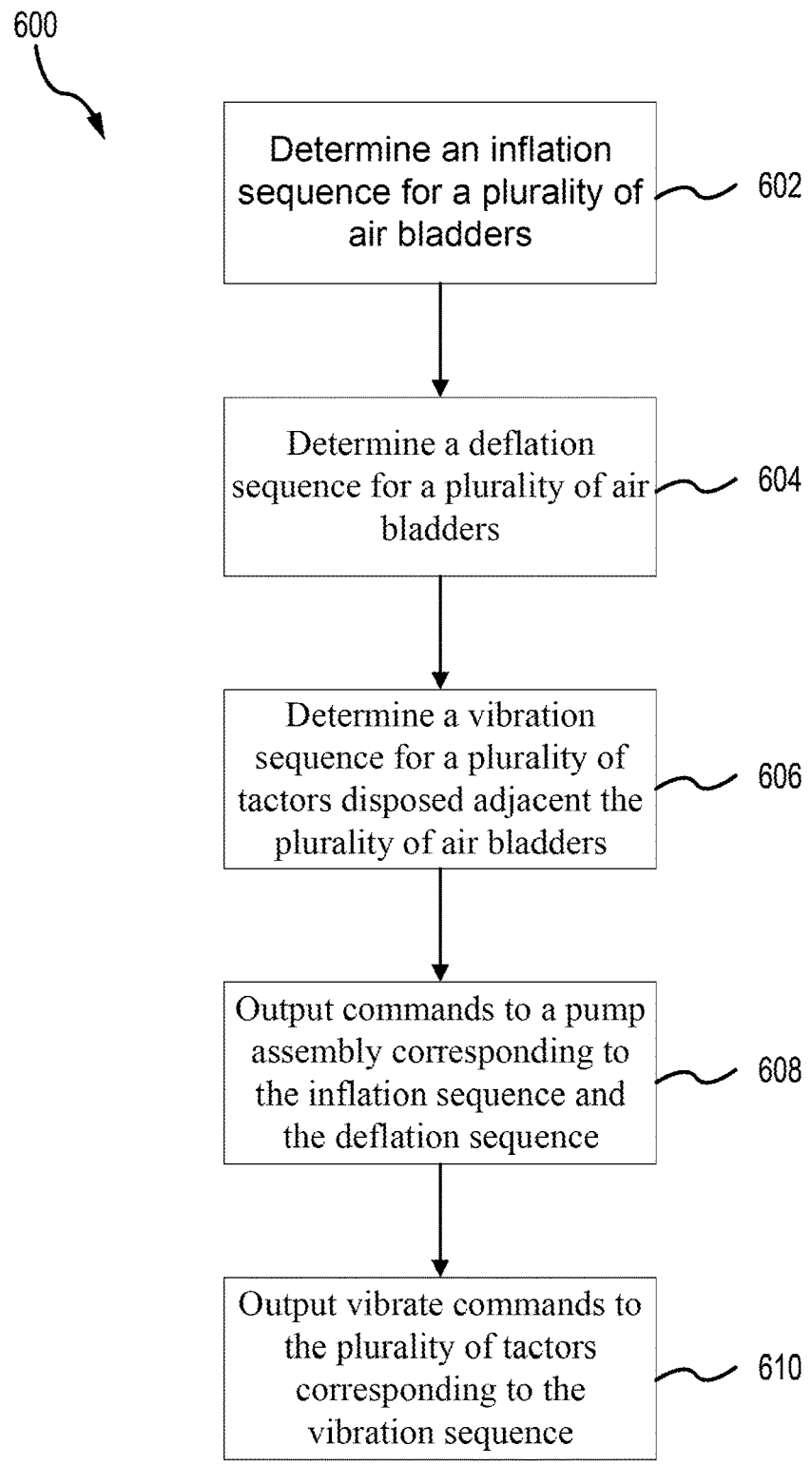
FIG. 6 illustrates a flow diagram for operating an endurance haptic system, in accordance with various embodiments.

Referring now to FIG. 6, in accordance with various embodiments, a method 600 for controlling an endurance haptic system is illustrated. Method 600 may be performed by a processor such as controller 112, controller 306, and/or controller 356. At block 602, the processor determines an inflation sequence for a plurality of air bladders. At block 604, the processor determines a deflation sequence for a plurality of air bladders. At block 606, the processor determines a vibration sequence for a plurality of tactors disposed adjacent the plurality of air bladders. At block 608, the processor outputs commands to a pump assembly corresponding to the inflation sequence and the deflation sequence. At block 610, the processor outputs vibrate commands to the plurality of tactors corresponding to the vibration sequence.

Figure 7:
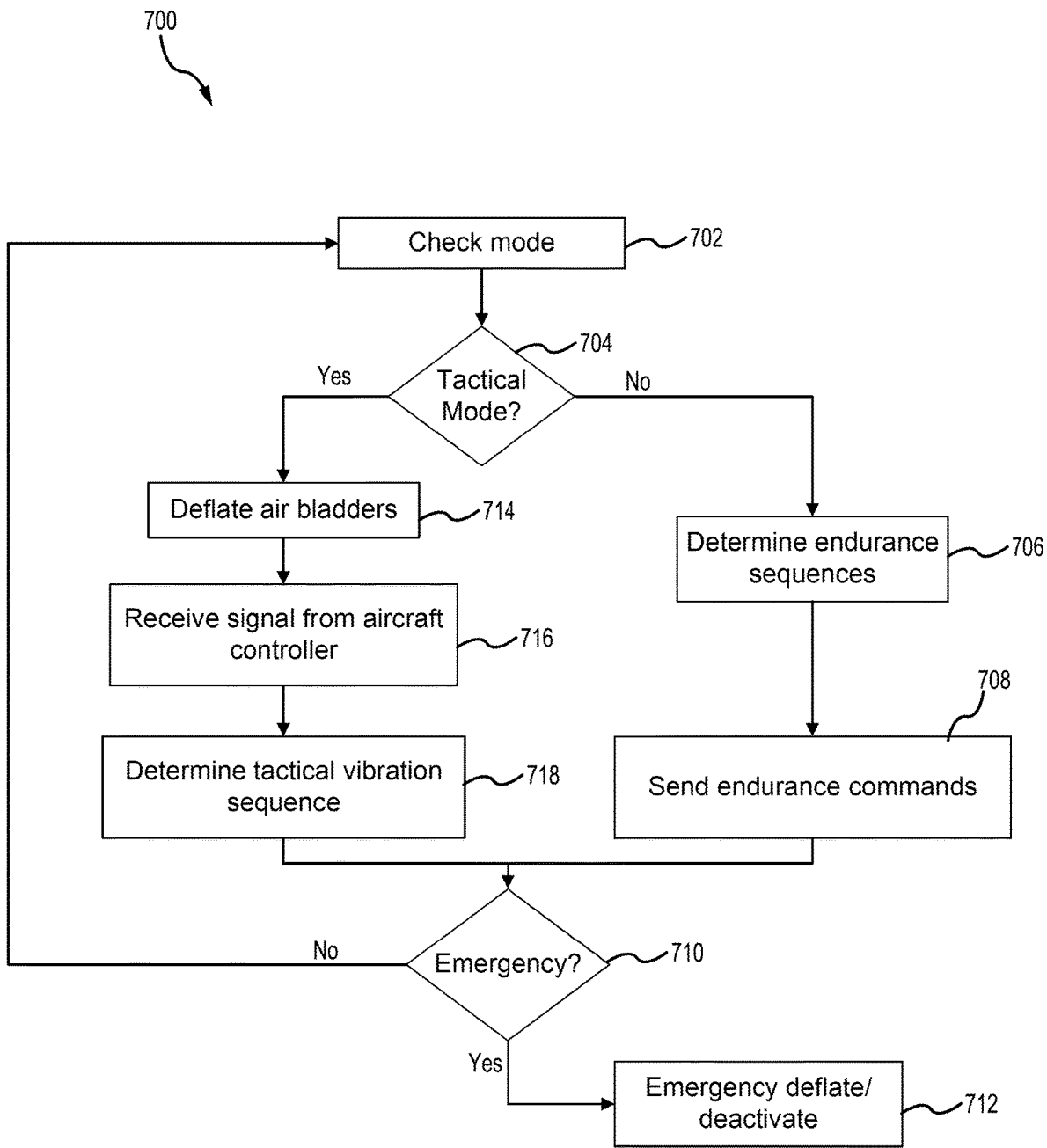
FIG. 7 illustrates a flow diagram for operating an endurance haptic system, in accordance with various embodiments.

Referring now to FIG. 7, in accordance with various embodiments, a method 700 for controlling an endurance haptic system is illustrated. Method 700 may be performed by a processor such as controller 112, controller 306, and/or controller 356. At block 702, the processor checks the current endurance haptic system mode, either tactical or non-tactical. The processor may command the endurance haptic system (e.g., endurance haptic system 120) to provide situational awareness to pilot 108 when in the tactical mode. In various embodiments, the processor may command the endurance haptic system to provide vibro-tactile stimulation and/or anti-fatigue stimulation when in the non-tactical mode.

At decision block 704, determines whether the endurance haptic system is in the tactical mode, or high sensitivity mode. If it is determined that the endurance haptic system is not in the tactical mode, method 700 proceeds to block 706.

At block 706, the processor determines an endurance sequence. In various embodiments, the endurance sequence may include an inflation and deflation sequence for use with seat air bladders 323 and/or seatback air bladders 325. In various embodiments, the inflation and deflation sequence may alternate which air bladders 323, 325 are being inflated and deflated. In various embodiments, the inflation and deflation sequence may partially inflate a single air bladder 323, 325 while deflating a different air bladder 323, 325 to promote blood circulation of the pilot 108 and reduce fatigue or improve comfort.

In various embodiments, the endurance sequence may include a vibration sequence for use with seat tactors 322 and/or seatback tactors 324. The vibration sequence may include a duration and a frequency for each tactor 322, 324. In various embodiments, the frequency may be an anti-fatigue frequency that is about 0.5 Hz to about 30 Hz, and more specifically, about 5 Hz to about 20 Hz. In various embodiments, the duration of each tactor in the vibration sequence may be an anti-fatigue duration that is about 1 second to about 60 seconds, and more specifically, about 5 seconds to about 30 seconds. In various embodiments, the anti-fatigue sequence may run for minutes to hours with each tactor being activated for the anti-fatigue duration. In various embodiments, the anti-fatigue duration may be pilot adjustable. In various embodiments, the anti-fatigue duration may be greater than 60 seconds. In various embodiments, the vibration sequence may activate a single tactor 322, 324 or multiple tactors 322, 324 at a time. In various embodiments, the vibration sequence may alternate which tactor 322, 324 is active. In various embodiments, the endurance sequence may include time periods in which the air bladders 323, 325 are inflated while tactors 322, 324 are active. In various embodiments, the endurance sequence may define a first time period in which air bladders 323, 325 are used and a second time period in which tactors 322, 324 are used, where the second time period does not overlap the first time period.

At block 708, the processor sends the endurance commands. For example, the processor sends the commands directly to the tactors 322, 324 to be activated. The processor may send the inflate commands to a pump assembly (e.g., pump assembly 362) to be executed.

At decision block 710, the processor checks whether there is an emergency situation. In various embodiments, an emergency may include an ejection event, a fast switch to a tactical mode, or other events. If it is determined that there is an emergency, the method 700 proceeds to block 712.

At block 712, the processor sends an emergency deflate/deactivate command. In various embodiments, the processor may send the emergency deflate/deactivate command to the pump assembly (e.g., pump assembly 362). In various embodiments, the emergency deflate may quickly deflate all air bladders 323, 325. Deflating air bladders 323, 325 in an emergency may prevent injury to pilot 108 caused by a soft and/or uneven sitting surface.

Returning to decision block 710, if, instead, it is determined that there is no emergency, method 700 returns to block 702.

Returning to decision block 704, if, instead, it is determined that the endurance haptic system is in the tactical mode, method 700 proceeds to block 714.

At block 714, the processor sends a command to deflate air bladders 323, 325 in response to the endurance haptic system being in tactical mode. In various embodiments, this provides a uniform sitting surface for pilot 108 that reduces the chance of injury to pilot 108 during flight.

At block 716, the processor receives a signal from an aircraft controller (e.g., aircraft controller 112).

At block 718, the processor interprets the signal and determines a tactical vibration sequence. The tactical vibration sequence may include a duration and a frequency for each tactor 322, 324. In various embodiments, the frequency may be an alert vibration frequency that is about 25 Hz to about 300 Hz, and more specifically, about 50 Hz to about 200 Hz. In various embodiments, the duration may be an alert duration that is about 0.5 seconds to about 5 seconds, and more specifically, about 1 second to about 3 seconds. In various embodiments, the alert duration may not be set and may instead continue until the alert ends. In various embodiments, the vibration sequence may activate a single tactor 322, 324 or multiple tactors 322, 324 at a time. For example, the vibration sequence may activate all left seat tactors 122L. The increased vibration frequency and decreased time provides a stronger signal to pilot 108 which in turn provides better situational awareness.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system, comprising:
    a cushion including a plurality of tactors and a plurality of air bladders disposed adjacent the plurality of tactors, wherein each air bladder of the plurality of air bladders is located between a set of tactors of the plurality of tactors;
    a pump assembly operably connected to the plurality of bladders;
    a processor; and
    a memory operatively coupled to the processor, the memory comprising instructions stored thereon that, when executed by the processor, cause the processor to:
        determine an inflation sequence for the plurality of air bladders;
        determine a deflation sequence for the plurality of air bladders;
        output commands to the pump assembly corresponding to the inflation sequence and the deflation sequence; and
        output vibrate commands to the plurality of tactors, wherein the system further comprises an aircraft controller, wherein the instructions, when executed by the processor, further cause the processor to:
        receive a signal from the aircraft controller;
        determine a vibration sequence for the plurality of tactors based on the signal received from the aircraft controller; and
        output vibrate commands corresponding to the vibration sequence to at least a subset of the plurality of tactors.

2. The system of claim 1, wherein the vibration sequence includes a duty cycle and a vibration frequency for each of the plurality of tactors, the vibration frequency being an anti-fatigue vibration frequency.

3. The system of claim 1, wherein the vibration sequence includes a vibration frequency for the subset of the plurality of tactors, the vibration frequency being an alert vibration frequency.

4. The system of claim 1, wherein the instructions, when executed by the processor, further cause the processor to:
    receive a signal indicating an emergency; and
    output commands to the pump assembly to deflate the plurality of air bladders in response to the receiving the signal.

* * * * *